United States Patent
Saitou et al.

(10) Patent No.: US 9,454,250 B2
(45) Date of Patent: Sep. 27, 2016

(54) TOUCH PANEL HAVING SCAN ELECTRODES WITH DIFFERENT WIDTHS

(71) Applicant: Japan Display Inc., Tokyo (JP)

(72) Inventors: Masanari Saitou, Tokyo (JP); Takahiro Miyazaki, Tokyo (JP); Koji Nagata, Tokyo (JP); Shinji Sekiguchi, Tokyo (JP); Tomohiko Ootani, Tokyo (JP)

(73) Assignee: Japan Display Inc., Tokyo (JP)

(*) Notice: Subject to any disclaimer, the term of this patent is extended or adjusted under 35 U.S.C. 154(b) by 13 days.

(21) Appl. No.: 14/521,493

(22) Filed: Oct. 23, 2014

(65) Prior Publication Data
US 2015/0116243 A1    Apr. 30, 2015

(30) Foreign Application Priority Data
Oct. 25, 2013 (JP) .................. 2013-222301

(51) Int. Cl.
*G06F 3/041* (2006.01)
(52) U.S. Cl.
CPC .................... *G06F 3/041* (2013.01)
(58) Field of Classification Search
USPC ....................................................... 345/173
See application file for complete search history.

(56) References Cited

U.S. PATENT DOCUMENTS

| 2010/0309162 | A1 | 12/2010 | Nakanishi et al. | |
| 2011/0018557 | A1* | 1/2011 | Badaye | G06F 3/044 324/658 |
| 2012/0075238 | A1* | 3/2012 | Minami | G06F 3/044 345/174 |
| 2014/0048854 | A1* | 2/2014 | Wang | G06F 3/0412 257/254 |

FOREIGN PATENT DOCUMENTS

JP    2010-282501 A    12/2010

* cited by examiner

*Primary Examiner* — Long D Pham
(74) *Attorney, Agent, or Firm* — Typha IP LLC (57) ABSTRACT

A technique capable of reducing the number of leading lines and making the area of a frame region smaller is provided. A display device includes an in-cell touch panel in which a pair of transparent substrates is arranged so as to oppose each other, a plurality of scanning electrodes are disposed on an opposing surface of one of the transparent substrates, and detection electrodes that intersect with the scanning electrodes are arranged on an opposing surface of the other transparent substrate. The display device further includes at least one first leading lines electrically connected the scanning electrodes and configured to supply a scanning signal to the scanning electrodes, and at least one second leading lines electrically connected to the detection electrodes and configured to output a signal detected by the detection electrodes. In the display device, each of the first leading lines is connected to at least two of the scanning electrodes having different widths.

8 Claims, 13 Drawing Sheets

Prior Art

Prior Art

FIG. 9

Prior Art

Prior Art

FIG. 14

TOUCH PANEL HAVING SCAN ELECTRODES WITH DIFFERENT WIDTHS

CLAIM OF PRIORITY

The present application claims priority from Japanese Patent Application JP 2013-222301 filed on Oct. 25, 2013, the content of which is hereby incorporated by reference into this application.

BACKGROUND OF THE INVENTION

1. Field of the Invention

The present invention relates to a display device, and more particularly to an in-cell touch panel including a pair of transparent substrates forming a display device and position detection electrodes formed on one of the pair of transparent substrates.

2. Description of the Related Art

Display devices that each include a detecting device (hereinafter referred to as touch panel) having a screen input function of receiving information through an operation (hereinafter referred to as touching or touch operation) of touching a screen using a finger of a user or other tools are used for mobile electronic devices such as mobile terminals, various home electric appliances, stationary user guide terminals such as an unmanned receiver. Especially, in recent years, capacitance touch panels are widely used mainly for mobile information terminals, since the capacitance touch panels have advantages in that multipoint input that is called multi-touch can be performed, transmittance is high, and the quality of a displayed image is not reduced. The capacitance touch panels include an external touch panel arranged on the side of a display screen included in a display device, a touch panel that is arranged on a front surface of a display device and in which capacitance electrodes are formed on a transparent substrate (cover glass) for protecting a display device, an on-cell touch panel in which electrodes are formed on an outer surface of a transparent substrate on the side of a display screen forming a display device, and an in-cell touch panel in which electrodes are formed on an inner surface (opposing surface) of a transparent substrate forming a display device.

Some of the display devices that each include a capacitance touch panel are exemplified by a touch panel, a display panel, and a display device that are described in JP-2010-282501-A. In the display device described in JP-2010-282501-A, detection electrodes are formed so as to intersect with a plurality of scanning electrodes. In this case, two types of electrodes that are among the detection electrodes and formed in different shapes are alternately arranged. This configuration will remove external noise superimposed on a detected signal in accordance with the difference between fringe capacitances of the two detection electrodes formed in the different shapes, thereby suppressing erroneous detections.

SUMMARY OF THE INVENTION

Figure 14:
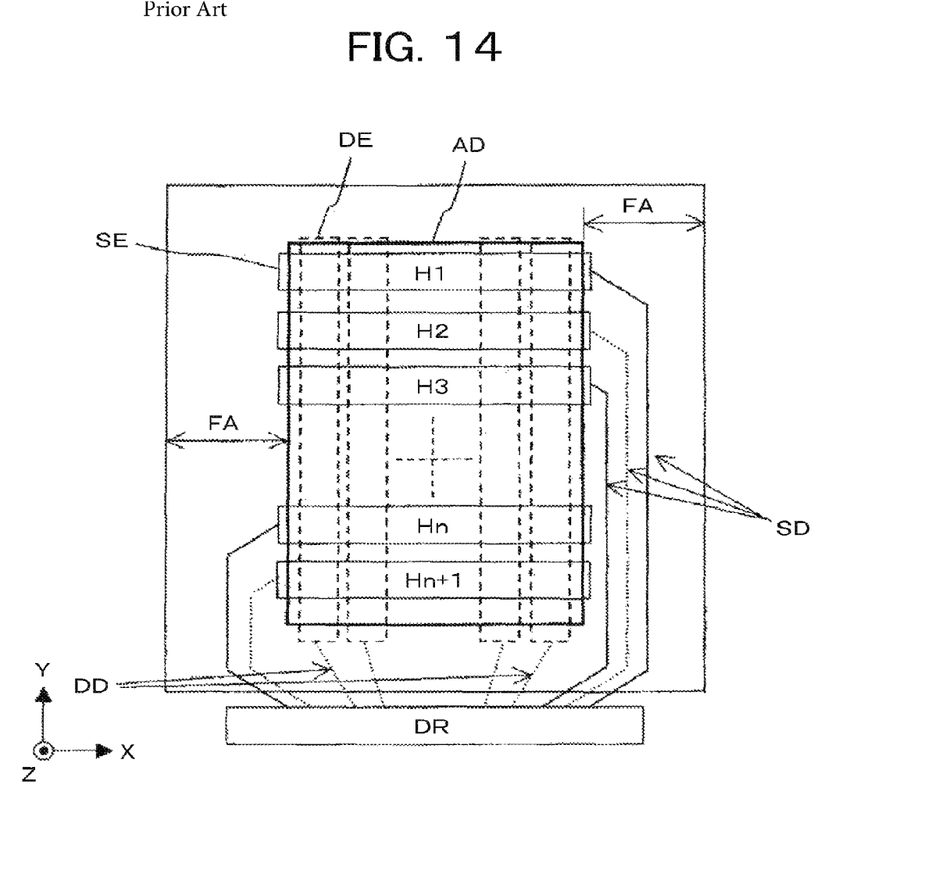
FIG. 14 is a plan view of a rough configuration of the conventional touch panel.

As illustrated in FIG. 14, in a display device provided with a conventional in-cell touch panel, leading lines (leading scanning lines) SD are formed in a frame region FA illustrated on the left side of FIG. 14 and a frame region FA illustrated on the right side of FIG. 14 in an efficient manner. Specifically, first leading scanning lines SD that are formed in the frame region FA illustrated on the right side of FIG. 14 and electrically connect between a driving circuit DR and scanning electrodes SE that are formed in the region at the upper side of FIG. 14, while second leading scanning lines SD that are formed in the frame region FA illustrated on the left side of FIG. 14 and electrically connect between the driving circuit DR and scanning electrodes SE that are formed in a region at the lower side of FIG. 14.

Meanwhile, regarding liquid crystal display devices arranged in mobile information terminals, high-definition large screens have been rapidly developed, and at the same time there is a strong demand for reductions in the sizes of frame regions FA that are formed around display regions and do not contribute for image display in order to arrange the liquid crystal display devices each having a large screen in housings of limited sizes. In addition, regarding in-cell touch panels, in order to secure detection regions AD corresponding to the inside of display regions, there is a demand for increases in the sizes of the detection regions AD and reductions in the sizes of frame regions, similarly to the display devices.

For a capacitance in-cell touch panel, however, in order to secure predetermined accuracy of detection and increase a detection region, the number of scanning electrodes SE and the number of detection electrodes DE will be increased. Thus, the number of leading lines SD and DD that connect the scanning electrodes to a driving circuit will also be increased. Especially, due to a problem where the size of a frame region FA is increased as a result of the rise in the number of the leading scanning lines SD, a method of solving this problem has been requested.

The invention has been made to solve these problems, and it is an object of the invention to provide a technique that can reduce the number of leading lines and make the size of a frame region smaller.

In order to solve the problems, a display device according to the invention includes an in-cell touch panel in which a pair of transparent substrates is arranged so as to oppose each other, a plurality of scanning electrodes are arranged on an opposing surface of one of the transparent substrates, and detection electrodes that intersect with the scanning electrodes are disposed on an opposing surface of the other transparent substrate. The display device further includes at least one first leading lines electrically connected the scanning electrodes and configured to supply a scanning signal to the scanning electrodes, and at least one second leading lines electrically connected to the detection electrodes and configured to output a signal detected by the detection electrodes. In the display device, each of the first leading lines is connected to at least two of the scanning electrodes having different widths.

According to the invention, the number of leading lines and the size of a frame region can be reduced.

Other advantages of the invention are clarified in the overall description.

PREFERRED EMBODIMENTS OF THE INVENTION

Hereinafter, embodiments of the invention are described with reference to the accompanying drawings. In the following description, the same elements are represented by the same reference numerals, and a repetitive description thereof is omitted. In addition, X, Y, and Z that are illustrated in FIGS. 1, 2, 6, and 10 to 13 represent an X axis, a Y axis, and a Z axis, respectively.

First Embodiment

Figure 1:
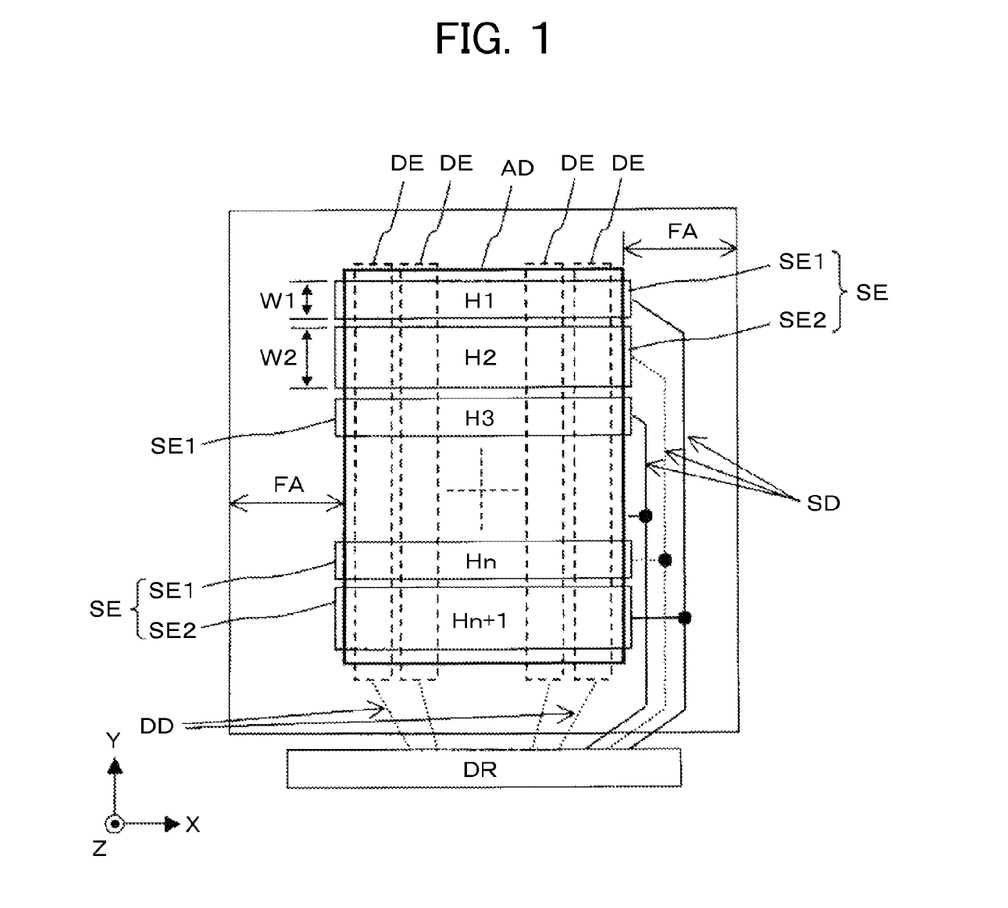
FIG. 1 is a plan view of an overall configuration of an in-cell touch panel portion included in a display device according to a first embodiment of the invention.

FIG. 1 is a plan view of an overall configuration of an in-cell touch panel portion included in a display device according to a first embodiment of the invention. First, an overall configuration of an in-cell touch panel according to the first embodiment will be described with reference to FIG. 1. In order to simplify the following description, only scanning electrodes SE, detection electrodes DE, leading scanning lines SD, and leading detection lines DD that are included in the in-cell touch panel are illustrated in FIG. 1 and each formed on any of opposing surfaces of a pair of transparent substrates forming a known liquid crystal display panel. A case where the in-cell touch panel is formed in the IPS liquid crystal display panel will be described below. The in-cell touch panel according to the first embodiment is applicable to a liquid crystal display device of another type, an organic EL display device, and the like.

In the in-cell touch panel (illustrated in FIG. 1) included in the display device according to the first embodiment, a driving circuit DR of the touch panel is mounted on a transparent substrate (a first substrate) SUB1 that is among the pair of transparent substrates SUB1 and SUB2 forming the liquid crystal panel and on which drain lines (not shown), gate lines (not shown), thin film transistors (not shown), and the like that are used for image display are mounted. The scanning electrodes SE composed of known transparent conductive films and the leading scanning lines (first leading lines) SD that electrically connect the scanning electrodes SE to the driving circuit DR are formed on the first substrate SUB1. The driving circuit DR is mounted on an opposing surface of the first substrate SUB1. Scanning signals are supplied from the driving circuit DR through the leading scanning lines SD to the scanning electrodes SE. In the IPS liquid crystal display panel, a common electrode is formed on the side of the first substrate SUB1, and thus the scanning electrodes SE that serve as a plurality of common electrodes can be formed on the first substrate SUB1.

The detection electrodes DE composed of known transparent conductive films and the leading detection lines (second leading lines) DD that electrically connect the detection electrodes DE to the driving circuit DR are formed on the transparent substrate (second substrate) SUB2 arranged opposite to the first substrate SUB1 through a liquid crystal layer (not shown). In this case, the driving circuit DR is mounted on the first substrate SUB1. Thus, the leading detection lines DD mounted on the second substrate SUB2 are electrically connected to the leading detection lines DD mounted on the first substrate SUB1 through known conductive resin (not shown) formed on opposing surfaces of the first and second substrates SUB1 and SUB2. In this configuration, capacitance of a touched scanning electrode SE is calculated by the driving circuit DR on the basis of a signal (detected signal) detected by a detection electrode DE, scanning electrodes SE1 and SE2 located at a touched position are identified, and the position touched by an operator and located in a detection region AD is detected. Specifically, a point of intersection of the scanning electrodes SE1 and SE2 with the detection electrode DE are detected and the position touched by the operator and located in the detection region AD is detected. The scanning electrodes SE1 and SE2 and the detection electrodes DE are arranged in a matrix form in the detection region AD.

As is apparent from FIG. 1, the scanning electrodes SE according to the first embodiment extend in X direction, are arranged side by side in Y direction and include the scanning electrodes (first scanning electrodes) SE1 with a width W1 and the scanning electrodes (second scanning electrodes) SE2 with a width W2, the width W1 being smaller than the width W2. In addition, the scanning electrodes SE1 and the scanning electrodes SE2 are alternately arranged in the Y axis direction with which the scanning electrodes SE are arranged side by side. Specifically, in the configuration according to the first embodiment, a scanning electrode SE1 that is represented by H1 in FIG. 1 and has the width W1 is formed in a first region from the upper side of FIG. 1, and a scanning electrode SE2 that is represented by H2 in FIG. 1 and has the width W2 is formed in a second region from the upper side of FIG. 1. In addition, a scanning electrode SE1 that is represented by H3 in FIG. 1 and has the width W1 is formed in a third region from the upper side of FIG. 1. Subsequently, scanning electrodes SE2 with the width W2 and scanning electrodes SE1 with the width W1 are alternately arranged in the Y axis direction. A scanning electrode SE1 that is represented by Hn and has the width W1 is formed in a second region from the lower side of FIG. 1, and a scanning electrode SE2 that is represented by Hn+1 and has the width W2 is formed in a first region from the lower side of FIG. 1. Note that n is an odd number of 1 or greater. The scanning electrodes SE2 with the width W2 may be arranged in odd number-th regions from the upper side of FIG. 1, while the scanning electrodes SE1 with the width W1 may be arranged in even number-th regions from the upper side of FIG. 1.

Furthermore, in the configuration according to the first embodiment, each pair of the scanning electrodes SE1 and SE2 that are the scanning electrodes SE with the different two widths W1 and W2 is electrically connected to a single leading scanning line SD. In the configuration, the same scanning signal is input to each pair of scanning electrodes SE1 and SE2. Specifically, in the configuration including the scanning electrodes SE according to the first embodiment, the scanning electrode SE1 having the width W1 and represented by H1 and the scanning electrode SE2 having the width W2 and represented by H1+1 are electrically connected to each other through a single leading scanning line SD. In the same manner, the scanning electrode SE2 having the width W2 and represented by H2 and the scanning electrode SE1 having the width W1 and represented by Hn are electrically connected to each other through a single leading scanning line SD. In the same manner, the scanning electrode SE1 having the width W1 and represented by H3 and the scanning electrode SE2 formed on the side of the driving circuit DR or on the lower side of FIG. 1 form a pair and are electrically connected to each other through a single leading scanning line SD. Another scanning electrode SE1 (not shown) formed on the opposite side of the driving circuit DR and another scanning electrode SE2 (not shown) formed on the side of the driving circuit DR are electrically connected to each other through a single leading scanning line SD so that the same scanning signal is supplied to the scanning electrode SE1 and the scanning electrode SE2. Specifically, the scanning electrodes are classified into two groups, a scanning electrode group (first electrode group) located in an upper half in Y direction and a scanning electrode group (second electrode group) located in a lower half in Y direction, while each pair of the scanning electrodes SE of the scanning electrode group located in the upper half and the scanning electrodes SE of the scanning electrode group located in the lower half is electrically connected to a single leading scanning line SD.

In the configuration including the scanning electrodes SE according to the first embodiment of the invention, the scanning electrodes SE1 and SE2 with the different widths form pairs so that each pair of the scanning electrodes SE1 and the scanning electrodes SE2 is connected to a single leading scanning line SD. Specifically, the scanning electrodes SE1 and SE2 that form capacitance of different values between the scanning electrodes and the detection electrodes DE form the pairs so that each pair of the scanning electrodes SE1 and the scanning electrodes SE2 is connected to a single leading scanning line SD. As a result, as described later, when a case where a scanning electrode SE located at a touched position is a scanning electrode SE1 with the width W1 is compared with a case where a scanning electrode SE located at a touched position is a scanning electrode SE2 with the width W2, responses (detected signals) detected by a detection electrode DE located at the touched position are different, caused by the different values of capacitance other than that at fringe portions. Thus, the touch panel according to the first embodiment determines which of the pair of scanning electrodes SE1 and SE2 to which the same scanning signal is supplied has been touched, and identifies the touched position on its screen.

Figure 2:
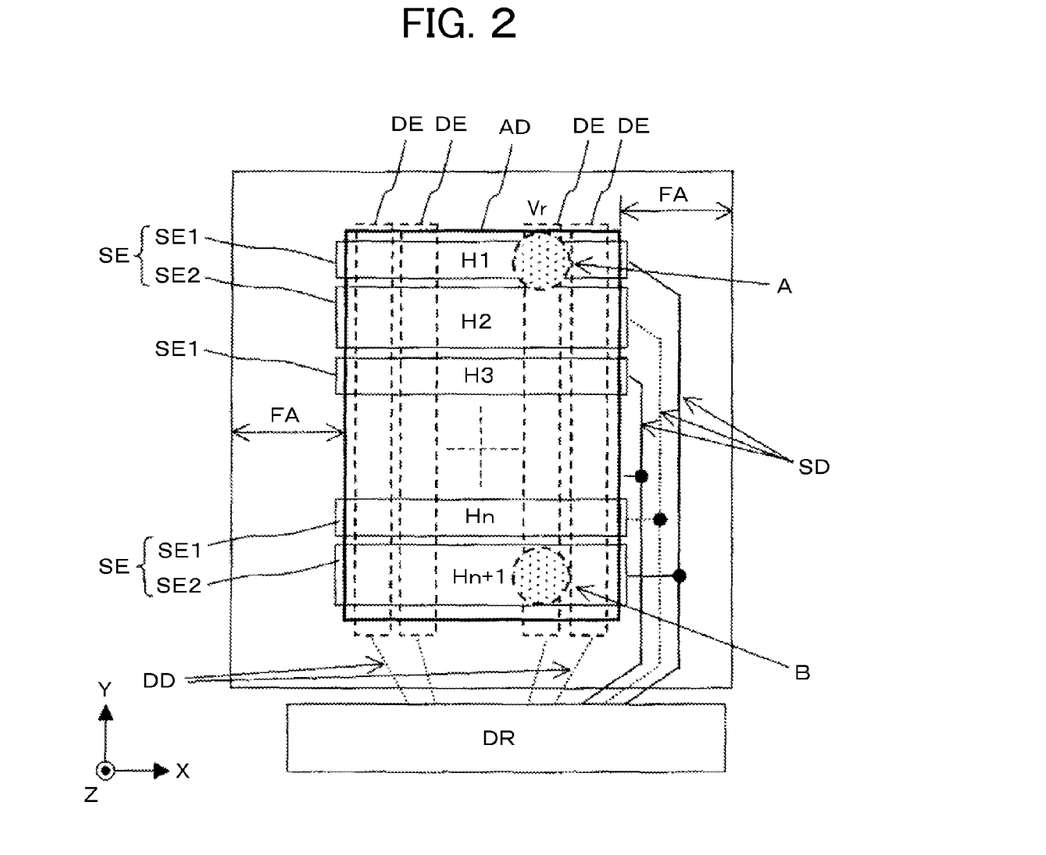
FIG. 2 is a plan view describing an operation of detecting a position touched on a touch panel according to the first embodiment of the invention.
Figure 3A:
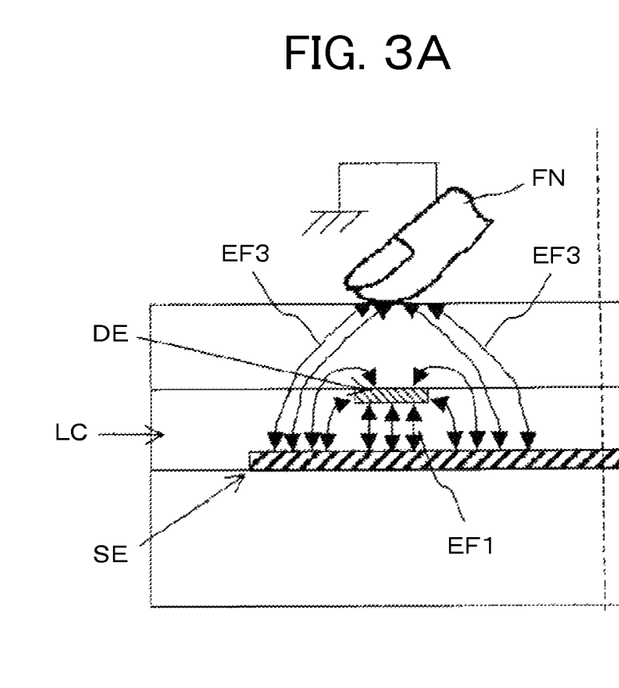
FIGS. 3A and 3B are cross-sectional views describing the operation of detecting a position touched on the touch panel according to the first embodiment of the invention.
Figure 3B:
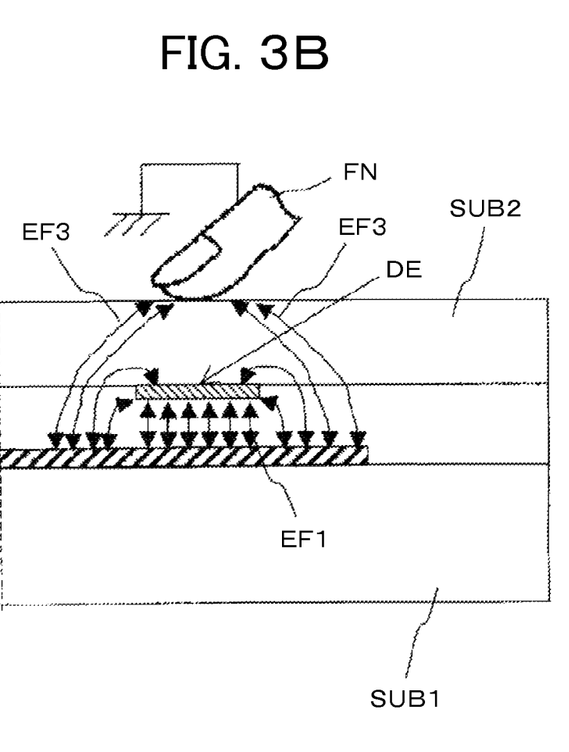
Figure 4:
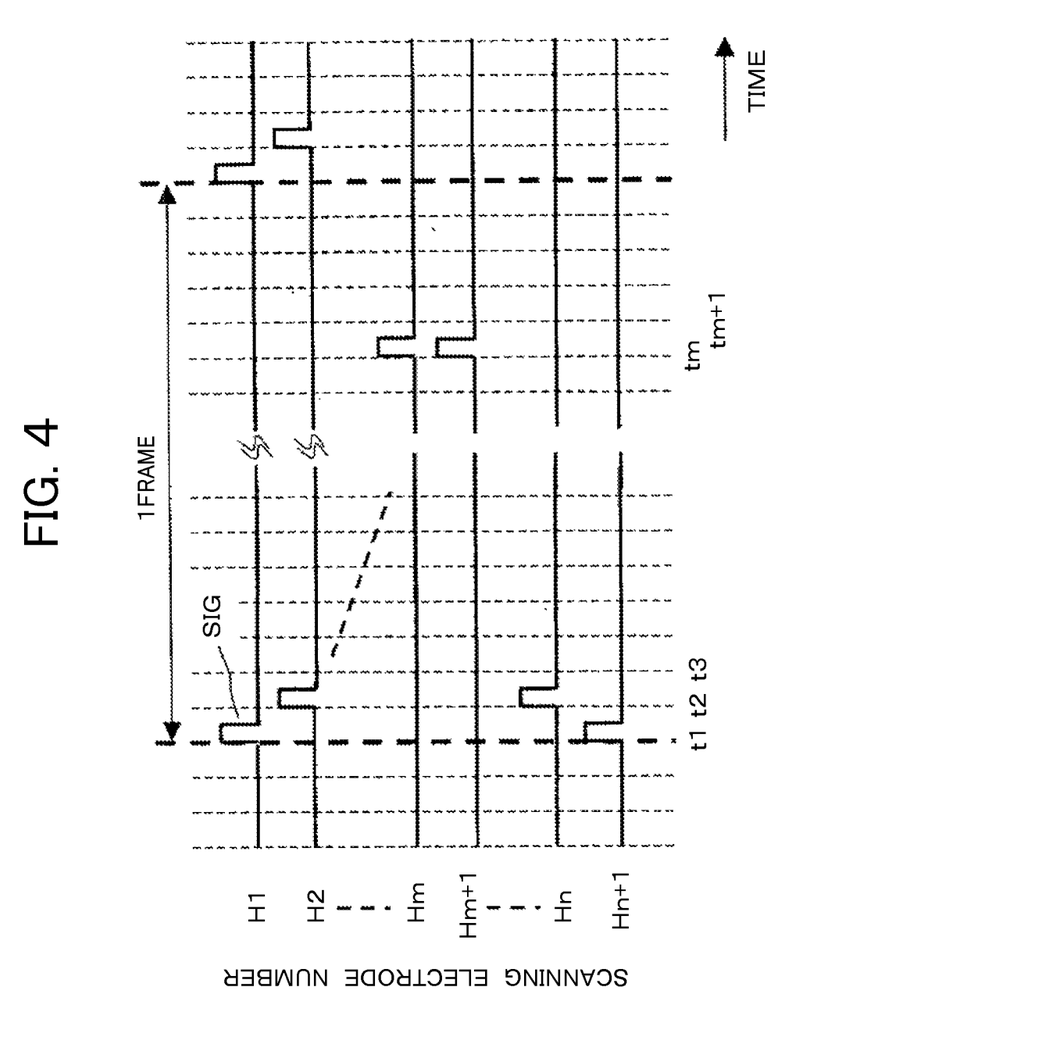
FIG. 4 is a diagram illustrating scanning signals to be input to scanning electrodes of the touch panel according to the first embodiment of the invention.
Figure 5:
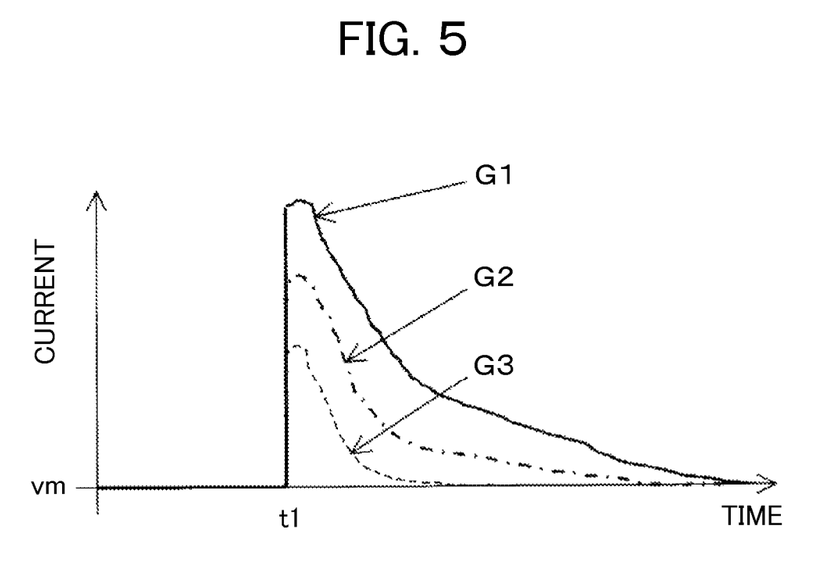
FIG. 5 is a diagram illustrating signals detected from the touch panel according to the first embodiment of the invention.
Figure 6:
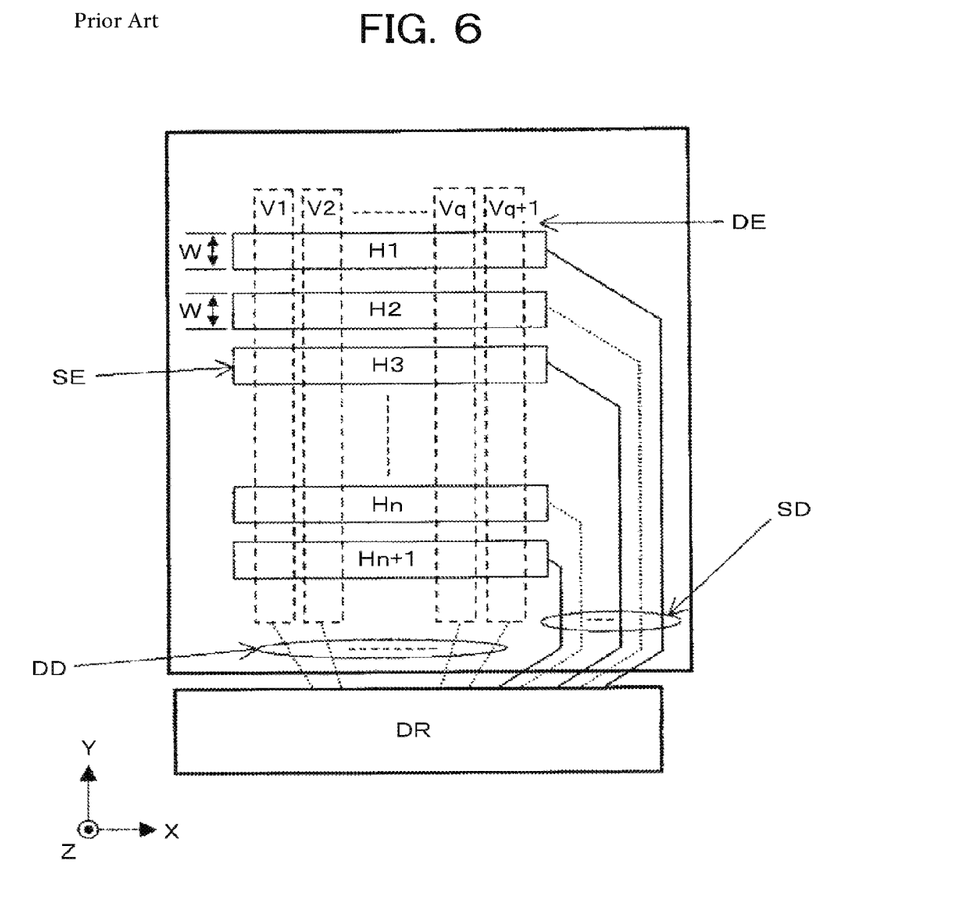
FIG. 6 is a plan view of a rough configuration of a conventional touch panel.
Figure 7A:
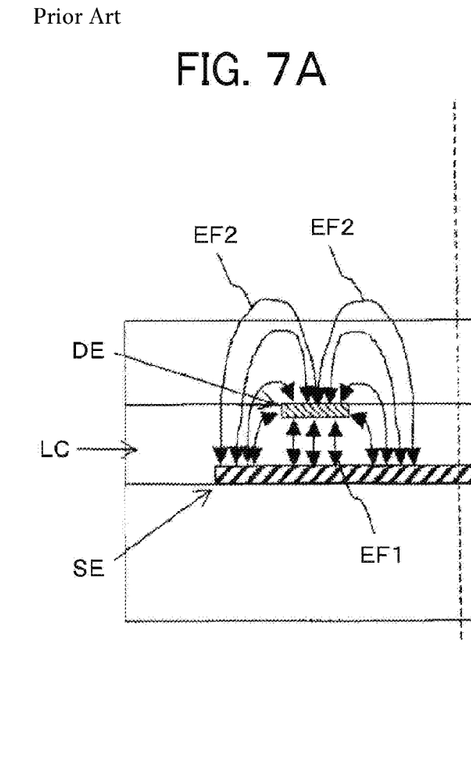
FIGS. 7A and 7B are cross-sectional views describing an operation of detecting a position touched on the conventional touch panel.
Figure 7B:
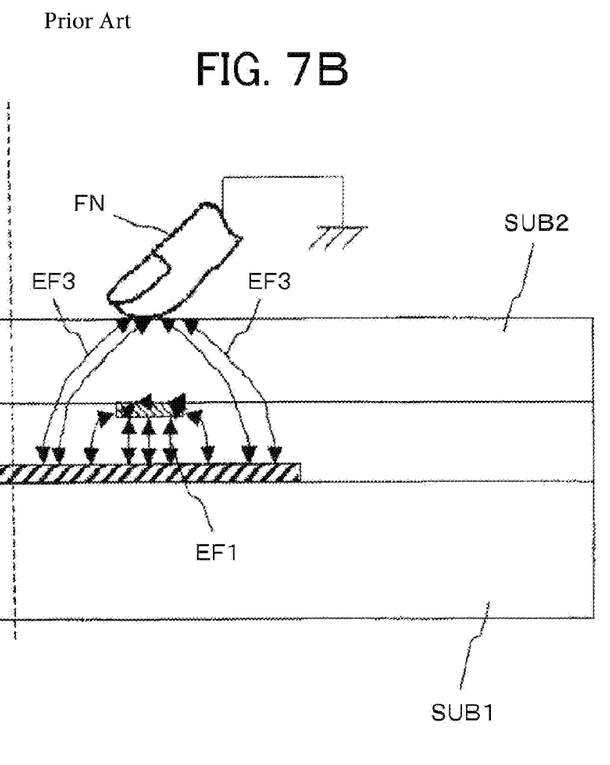
Figure 8:
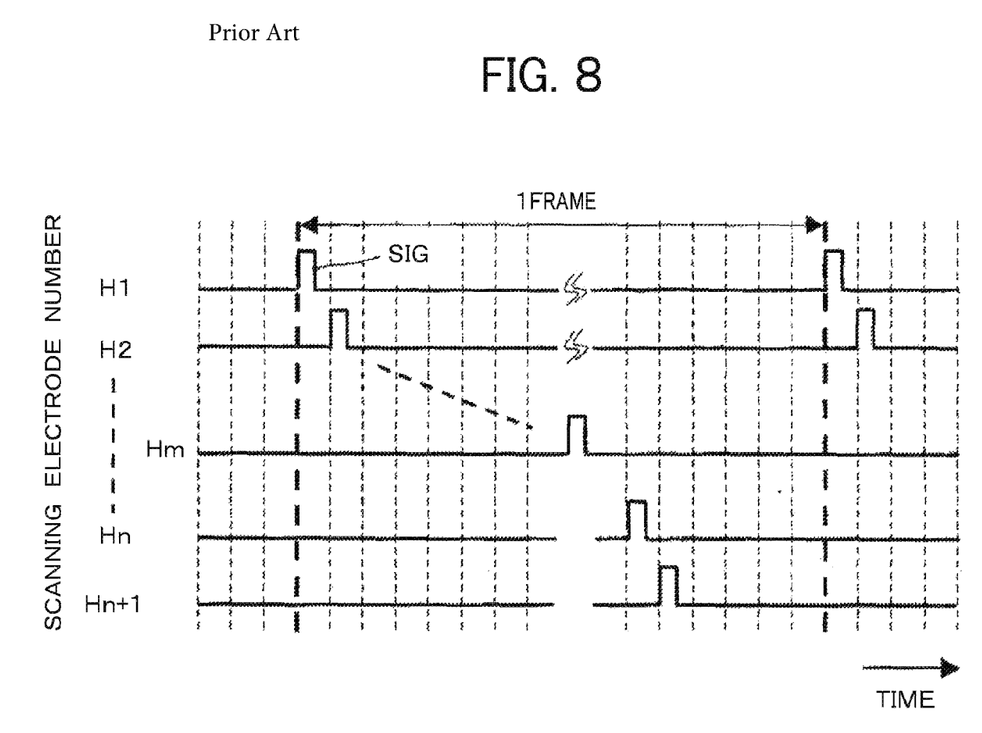
FIG. 8 is a diagram describing scanning signals to be input to scanning electrodes of the conventional touch panel.
Figure 9:
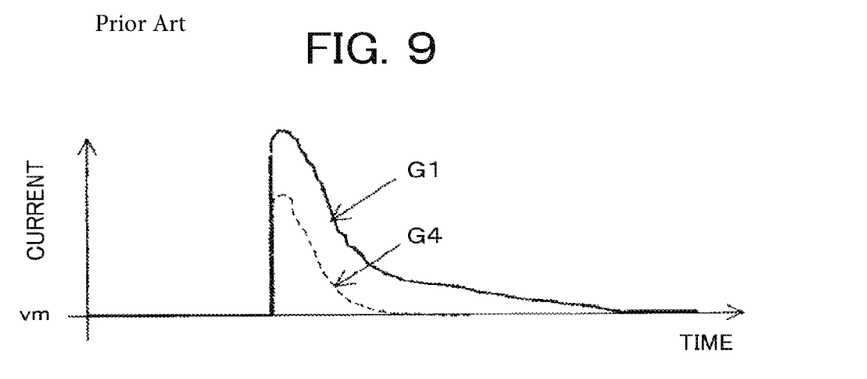
FIG. 9 is a diagram illustrating signals detected from the conventional touch panel.
Figure 10:
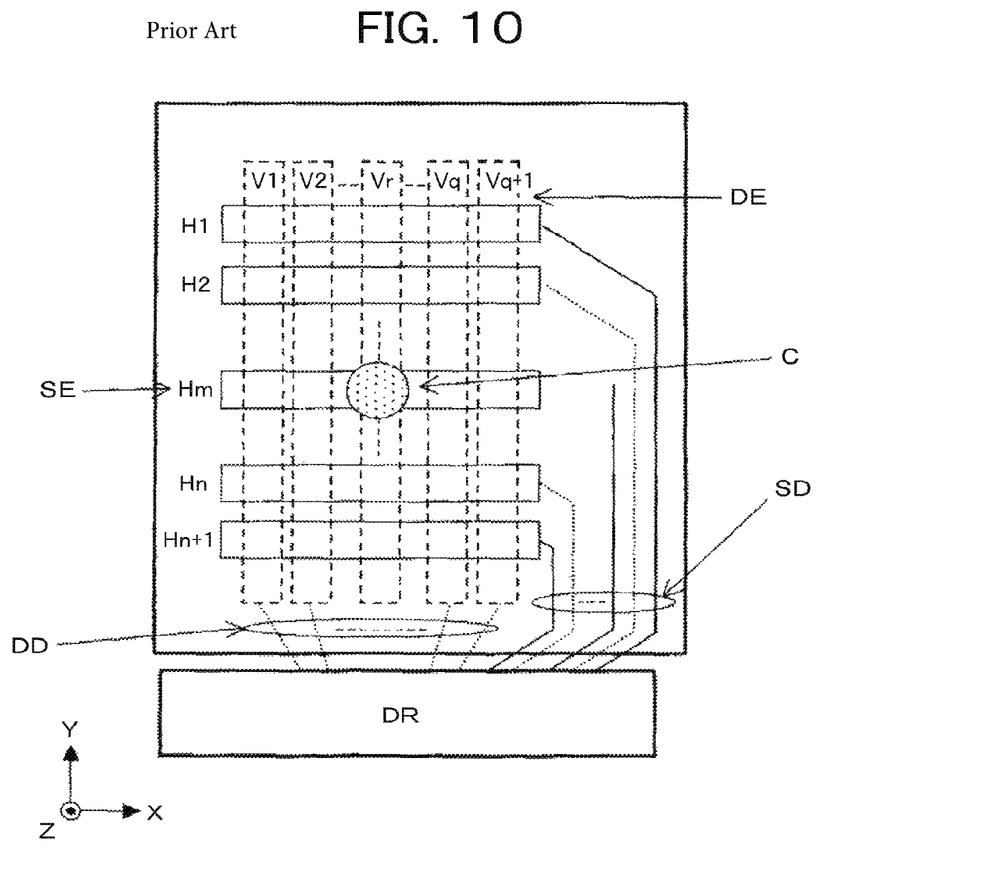
FIG. 10 is a plan view describing an operation of detecting a position touched on the conventional touch panel.

FIG. 2 is a plan view describing an operation of detecting a position touched on the touch panel according to the first embodiment of the invention. FIGS. 3A and 3B are cross-sectional views describing the operation of detecting a position touched on the touch panel according to the first embodiment of the invention. FIG. 4 is a diagram illustrating scanning signals to be input to scanning electrodes of the touch panel according to the first embodiment of the invention. FIG. 5 is a diagram illustrating signals detected from the touch panel according to the first embodiment of the invention. FIG. 6 is a plan view of a rough configuration of a conventional touch panel. FIGS. 7A and 7B are cross-sectional views describing an operation of detecting a position touched on the conventional touch panel. FIG. 8 is a diagram describing scanning signals to be input to scanning electrodes of the conventional touch panel. FIG. 9 is a diagram illustrating signals detected from the conventional touch panel. FIG. 10 is a plan view describing an operation of detecting a position touched on the conventional touch panel. The cross-sectional views of FIGS. 7A and 7B are the cross-sectional views illustrating an intersection of scanning and detection electrodes, taken in a direction in which the scanning electrode extends. In addition, FIGS. 3A and 3B are the cross-sectional views illustrating an intersection of scanning and detection electrodes, taken in a direction in which the scanning electrode extends. FIGS. 3A and 3B illustrate that the areas of regions in which the scanning electrode overlaps the detection electrodes are treated as the lengths of the detection electrodes.

The operation of detecting a position touched on the conventional touch panel will be described with reference to FIGS. 6 to 10. As illustrated in FIG. 6, in the conventional touch panel, scanning electrodes SE that extend in X direction and are arranged side by side in Y direction have the same width W regardless of the positions of the formed scanning electrodes. As a result, values of the capacitance of the first to n+1-th scanning electrodes SE represented by H1 to Hn+1 are substantially the same for detection electrodes DE. Moreover, the respective scanning electrodes SE are connected to a driving circuit DR through leading scanning lines SD corresponding to the scanning electrodes SE, while scanning signals are supplied to the scanning electrodes SE through the leading scanning lines SD.

In the conventional touch panel having the aforementioned configuration, an electric field is generated between the scanning electrodes SE and the detection electrodes DE through a liquid crystal layer LC that is an insulating body, when the touch panel is not touched and a voltage is applied to the scanning electrodes. In this case, as illustrated in FIG. 7A, in regions in which the scanning electrodes SE and the detection electrodes DE overlap each other, electric lines of force EF1 are generated between opposing surfaces of the scanning electrodes SE and opposing surfaces of the detection electrodes DE. In regions in which the scanning electrodes SE and the detection electrodes DE do not overlap each other or in fringe portions, meanwhile, electric lines of force EF1 are generated between the opposing surfaces of the scanning electrodes SE and edge surfaces of the detection electrodes DE and between the opposing surfaces of the scanning electrodes SE and back surfaces of the detection electrodes DE.

As illustrated in FIG. 7B, when an operator touches the conventional touch panel with a finger FN, electric lines of force EF1 are generated between an opposing surface of a scanning electrode SE and an opposing surface of a detection electrode DE, similarly to the case where the conventional touch panel is not touched. In a region in which the scanning electrode SE and the detection electrode DE do not overlap each other or in a fringe portion, electric lines of force EF3 are generated between the opposing surface of the scanning electrode SE and the finger FN.

In this case, as illustrated in FIG. 8, in the conventional touch panel, a scanning signal SIG of a predetermined voltage is sequentially applied to the first to n+1-th scanning electrodes SE represented by H1 to Hn+1. Thus, as illustrated in FIG. 9, electric lines of force in the fringe portion are attracted to the finger FN to form the electric lines of force EF3 at the time of the touch operation, and current values detected by the detection electrode DE are reduced as indicated by a graph G4, compared with a graph G1 that represents current values detected by the detection electrodes DE when the conventional touch panel is not touched. For example, as illustrated in FIG. 10, when the operator touches a position (represented by a circle and C in FIG. 10) at which an m-th scanning electrode SE represented by Hm intersects with an r-th detection electrode DE represented by Vr and the scanning signal SIG is input to the m-th scanning electrode SE represented by Hm as illustrated in FIG. 8, a signal corresponding to the graph G4 illustrated in FIG. 9 is measured by the r-th detection electrode DE represented by Vr, and signals corresponding to the graph G1 are measured by the other detection electrodes DE. As a result, the driving circuit DR can identify the position touched by the finger FN of the operator on the basis of the output timing of the scanning signal SIG and the signals (detected signals) measured by the detection electrodes DE and corresponding to the graphs G1 and G4.

Differently from the conventional touch panel, in the touch panel according to the first embodiment, each pair of the scanning electrodes SE1 and SE2 that have the different widths W1 and W2 is connected to a single leading scanning line SD as described above. Thus, in the touch panel according to the first embodiment, electric lines of force generated in a fringe portion between a scanning electrode SE1 with the width W1 and the finger FN when the operator touches the touch panel are different from electric lines of force generated in a fringe portion between a scanning electrode SE2 with the width W2 and the finger FN when the operator touches the touch panel.

Details will be described below with reference to FIGS. 2 to 5. The following operations of detecting positions at which two scanning electrodes SE1 and SE2 connected to a single leading scanning line SD intersect with a detection electrode DE will be described below in detail: an operation of detecting a position (represented by a circle and A in FIG. 2) at which a first scanning electrode SE1 represented by H1 intersects with an r-th detection electrode represented by Vr as illustrated in FIG. 2; and another operation of detecting a position (represented by a circle and B in FIG. 2) at which an n+1-th scanning electrode SE2 represented by Hn+1 intersects the r-th detection electrode DE represented by Vr.

As illustrated in FIGS. 3A and 3B, regarding regions in which the scanning electrodes SE1 and SE2 with the widths W1 and W2 overlap the detection electrode DE, the area of the region in which the scanning electrode SE2 with the width W2 overlaps the detection electrode DE is larger than the area of the region in which the scanning electrode SE1 with the width W1 overlaps the detection electrode DE. In this case, as illustrated in FIGS. 3A and 3B, the number of electric lines of force EF1 generated between the opposing surface of the scanning electrode SE2 and the opposing surface of the detection surface DE is larger than the number of electric lines of force EF1 generated between the opposing surface of the scanning electrode SE1 and the opposing surface of the detection surface DE. In regions in which the scanning electrodes SE1 and SE2 do not overlap the detection electrodes DE or in the fringe portions, electric lines of force EF3 are generated between the finger FN touching the panel and the opposing surfaces of the scanning electrodes SE1 and SE2. In this case, the electric lines of force EF1 generated between the scanning electrode SE1 and the detection electrode DE1 and the electric lines of force EF3 generated between the scanning electrode SE1 and the finger FN when the position A at which the scanning electrode SE1 with the width W1 intersects with the detection electrode DE is touched are different from the electric lines of force EF1 generated between the scanning electrode SE2 and the detection electrode DE1 and the electric lines of force EF3 generated between the scanning electrode SE2 and the finger FN when the position B at which the scanning electrode SE2 with the width W2 intersects with the detection electrode DE is touched. The differences may depend on the size of the finger FN.

As a result, even when the same scanning signal SIG is supplied to the scanning electrodes SE1 and SE2 in a time period from t1 to t2 as illustrated in FIG. 4, detected signals represented by the graphs G2 and G3 and corresponding to the widths W1 and W2 are measured at the time of the touch operation as illustrated in FIG. 5. Specifically, when a part corresponding to the scanning electrode SE1 with the width W1 is touched, a signal of which a current changes as indicated by the graph G3 is measured. When a part corresponding to the scanning electrode SE2 with the width W2 is touched, a signal of which a current changes as indicated by the graph G2 is measured. Furthermore, a signal of which a current changes as indicated by the graph G1 is detected when the touch panel is not touched.

Thus, in the touch panel according to the first embodiment, the driving circuit DR can identify a position touched by the finger FN of the operator on the basis of the output timing of the scanning signal SIG and the signals (detected signals) measured by the detection electrode DE and corresponding to the graphs G1, G2, and G3.

As described above, in the liquid crystal display device having the in-cell touch panel according to the first embodiment, at least two scanning electrodes SE1 and SE2 are connected to each leading scanning line SD and have the different widths W1 and W2 or have capacitance of different values for the detection electrodes DE or the finger FN serving as a dielectric body that touches the touch panel. In addition, since a difference between changes in currents at the time of a touch operation are detected by the detection electrodes, whether a position corresponding to either scanning electrode SE1 or SE2 connected to a single leading scanning line SD has been touched can be detected. Specifically, by comparing a current change (transient response) detected by a detection electrode DE on the basis of a capacitance change caused by an operation of touching a front surface of the touch panel with a first determination level and a second determination level, whether or not a position corresponding to either the scanning electrode SE1 or SE2 to which the same scanning signal SIG is supplied has been touched is determined. As long as a touch position can be determined on the basis of the different widths W1 and W2 of the scanning electrodes SE1 and SE2, a detection method (for example, a method for detecting capacitance between electrodes or the like) other than the detection method using a change in a current during a transient response may be used.

As a result, the number of leading scanning lines connecting the scanning electrodes to the driving circuit can be reduced to a half of the number of the scanning electrodes, and a frame region in which the leading scanning lines are arranged can be significantly downsized.

In addition, in the configuration according to the first embodiment, the number of the leading scanning lines can be reduced without a decline in the number of the scanning electrodes, and thus the number of output pulses of the scanning signal SIG can be doubled without a change in the widths of the pulses of the scanning signal SIG. As a result, a time required for scanning performed in order to detect an operation of touching the front surface of the touch panel or a time required for a single frame time period can be reduced to half. Moreover, since the detection can be performed twice in a conventional single frame time period, the speed of the detection can be doubled. If the number of times of the detection is increased, multiple touched positions can be detected at a high speed at the time of an operation (drag motion touch), such as drag and flick, of moving the touched positions. Thus, an operation using the touch panel can be smoothly performed.

Figure 11:
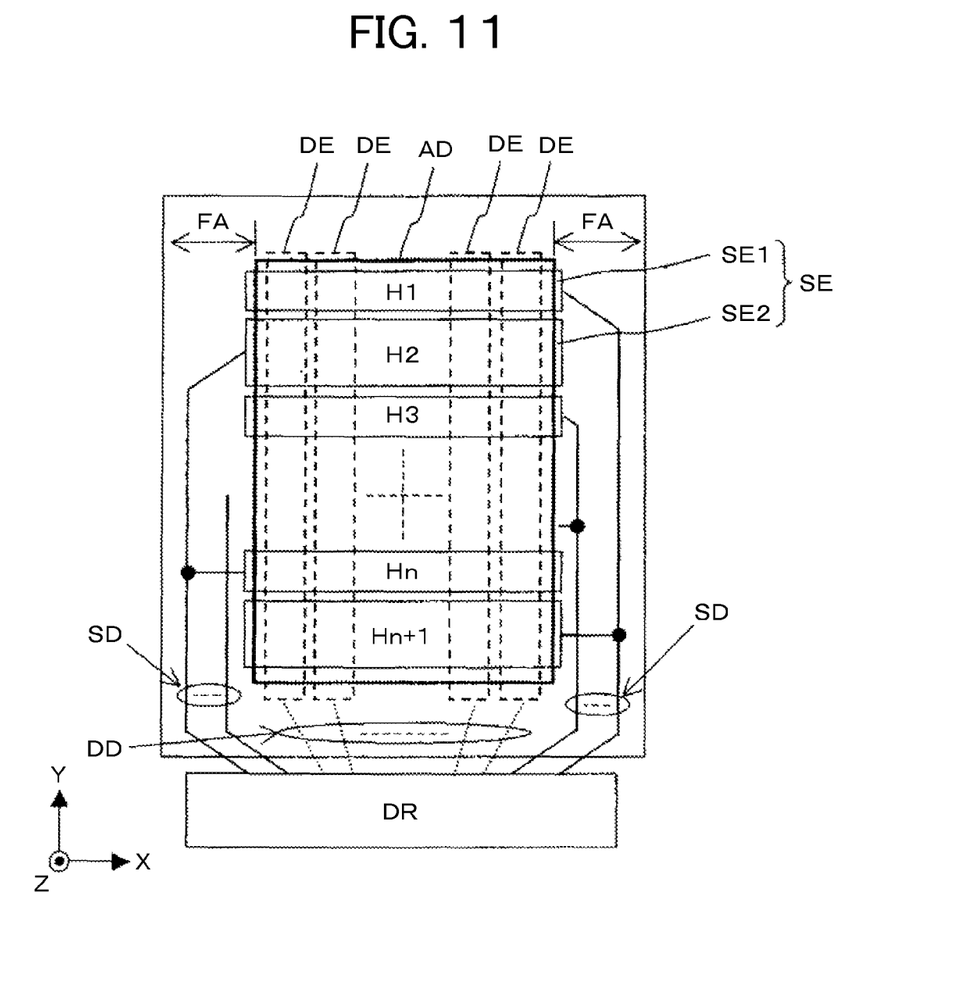
FIG. 11 is a plan view of an overall configuration of another in-cell touch panel portion included in a display device according to the first embodiment of the invention.

In the touch panel (illustrated in FIG. 1) according to the first embodiment, the scanning lines SD are arranged only in the frame region illustrated on the right side of FIG. 1. The arrangement, however, is not limited to such. For example, as illustrated in FIG. 11, the leading scanning lines SD may be formed in two frame regions illustrated on the left and right sides of FIG. 11 or regions located on the sides of both ends of the scanning electrodes SE1 and SE2.

In the configuration according to the first embodiment, the scanning electrodes SE1 with the width W1 and the scanning electrodes SE2 with the width W2 are alternately arranged. The scanning electrodes SE, however, may have three or more different widths. In this case, each group of scanning electrodes with the three or more different widths is electrically connected to a single leading scanning line SD.

Only the driving circuit of the touch panel among driving circuits is illustrated in the first embodiment. However, a drain line driving circuit (not shown) configured to generate image signals (grayscale signals and drain signals) to be supplied to pixels for display, and a gate line driving circuit (not shown) configured to generate scanning signals (gate signals) for display control, are mounted in the same side portion as the driving circuit DR of the touch panel. The drain line driving circuit, the gate line driving circuit, and the driving circuit DR may be formed in a single semiconductor chip.

Second Embodiment

Figure 12:
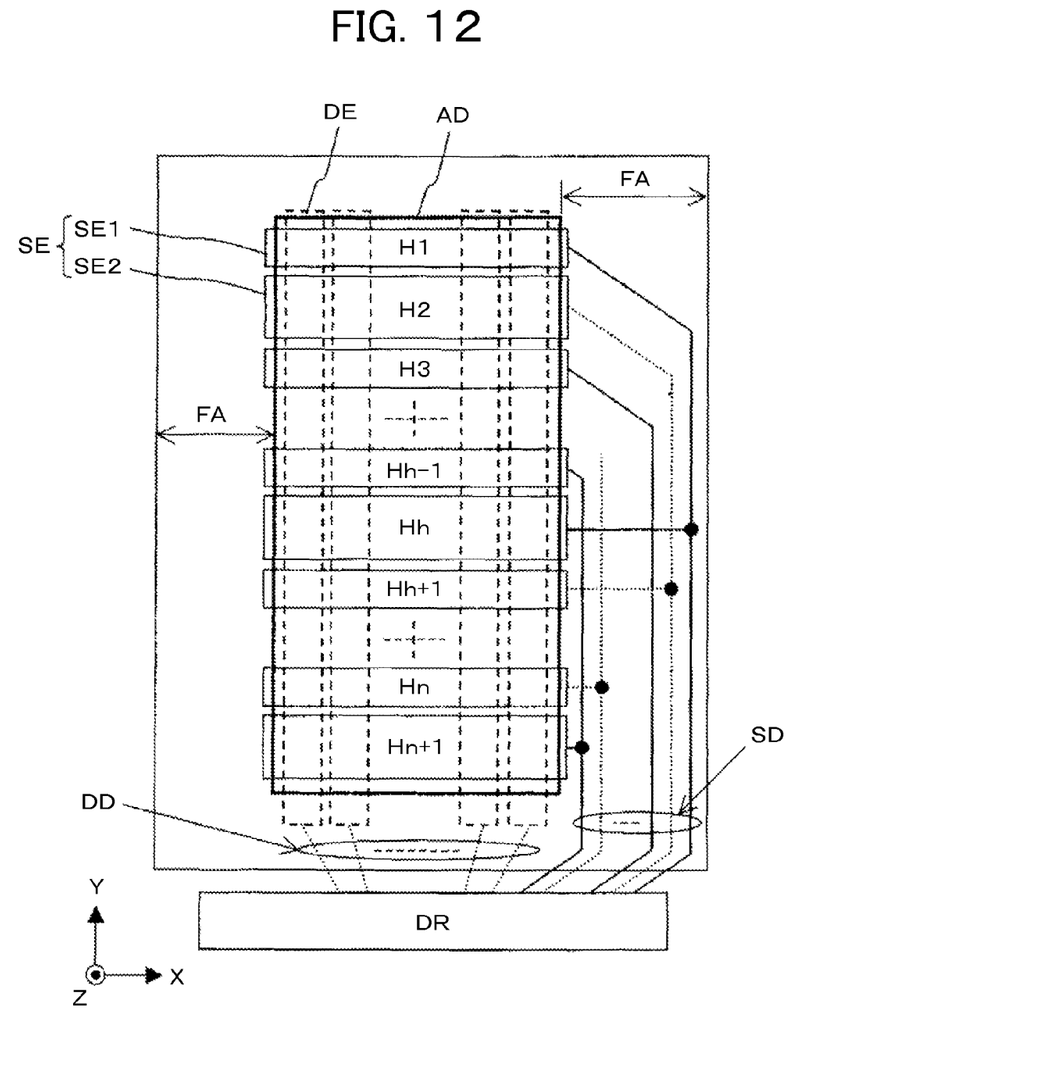
FIG. 12 is a plan view of an overall configuration of an in-cell touch panel portion included in a display device according to a second embodiment of the invention.

FIG. 12 is a plan view of an overall configuration of an in-cell touch panel included in a display device according to a second embodiment of the invention. Only the arrangement of the scanning electrodes SE1 and SE2 that have the different widths W1 and W2 and of which each pair is connected to a single leading scanning line SD is different from the first embodiment, but other configurations according to the second embodiment are the same as the first embodiment. Thus, the arrangement of the scanning electrodes SE1 and SE2 of which each pair is connected to a single leading scanning line SD will be described below in detail.

As illustrated in FIG. 12, in the touch panel according to the second embodiment, the scanning electrodes SE1 and SE2 that are arranged side by side in Y direction are classified into an upper half and a lower half in the same manner as the first embodiment, each pair of scanning electrodes included in the upper half and scanning electrodes included in the lower half being connected to a single leading scanning line SD. In this case, the odd-number-th scanning electrodes SE1 from the upper side of FIG. 12 each have the width W1, and the even-number-th scanning electrodes SE2 from the upper side of FIG. 12 each have the width W2. Accordingly, in the configuration according to the second embodiment, the scanning electrode SE1 located in a top region of the upper half (illustrated in FIG. 12) and the scanning electrode SE2 located in a bottom region of the lower half (illustrated in FIG. 12) are connected to a single leading scanning line SD. The scanning electrode SE1 located in a second top region of the upper half (illustrated in FIG. 12) and the second bottom scanning electrode SE2 located in a second bottom region of the lower half (illustrated in FIG. 12) are connected to a single leading scanning line SD. Subsequently, each pair of the scanning electrodes of the upper half (illustrated in FIG. 12) and the scanning electrodes of the lower half (illustrated in FIG. 12) is connected to a leading scanning line.

In the configuration of the touch panel according to the second embodiment, the total number of the scanning electrodes SE1 and SE2 is configured to be an even number. Thus, if $h=(n+1)/2$, an h-th scanning electrode located in a top region of the lower half (illustrated in FIG. 12) is the h-th scanning electrode SE2 with the width W2. The second scanning electrode SE2 represented by H2 and the h+1-th scanning electrode SE1 represented by Hh+1 are connected to a single scanning line SD. Subsequently, an n−1-th scanning electrode SE1 represented by Hh−1 and an n+1-th scanning electrode SE2 represented by Hh+1 are connected to a single leading scanning line SD.

In the configuration according to the second embodiment, each pair of the scanning electrodes SE1 with the width W1 and the scanning electrodes SE2 with the width W2 is connected to a single leading scanning line SD. For this reason, the same advantages as in the first embodiment can be obtained.

In the touch panel according to the second embodiment, intervals between the scanning electrodes SE1 and the scanning electrodes SE2 are substantially equal to each other, while each pair of the scanning electrodes SE1 and the scanning electrodes SE2 is connected to a single leading scanning line SD. Hence, waveforms of signals detected by the detection electrodes DE can be equivalent with each other regardless of where a touched position is, whereby a special advantage in which the accuracy of the detection can be improved can be therefore obtained.

Third Embodiment

Figure 13:
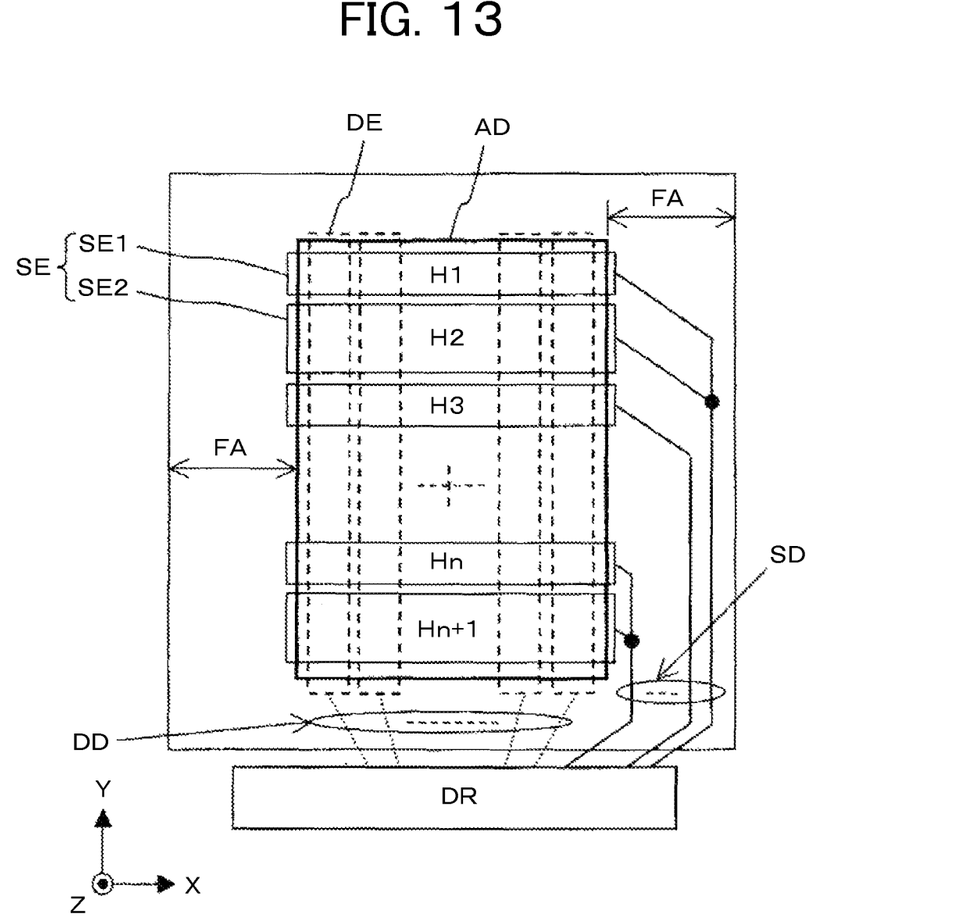
FIG. 13 is a plan view of an overall configuration of an in-cell touch panel portion included in a display device according to a third embodiment of the invention.

FIG. 13 is a plan view of an overall configuration of an in-cell touch panel included in a display device according to a third embodiment of the invention. Only the arrangement of the scanning electrodes SE1 and SE2 that have the different widths W1 and W2 and of which each pair is connected to a scanning line SD is different from that of the first embodiment, but other configurations are the same as that of the first embodiment.

As illustrated in FIG. 13, in the configuration of the touch panel according to the third embodiment, each pair of the scanning electrodes SE1 with the width W1 and the scanning electrodes SE2 with the width W2 is connected to a scanning line SD. In this case, in the configuration according to the third embodiment, each adjacent pair of odd-number-th scanning electrodes SE1 and even-number-th scanning electrodes SE2 is connected to a single leading scanning line SD. Specifically, a first scanning electrode SE1 represented by H1 and a second scanning electrode SE2 represented by H2 are connected to a single leading scanning line SD. Subsequently, a third scanning electrode SE1 represented by H3 and a fourth scanning electrode SE2 represented by H4 are connected to a single leading scanning line SD. An n-th scanning electrode SE1 represented by Hn and included in a lower half illustrated in FIG. 13 and an n+1-th scanning electrode SE2 represented by Hn+1 and included in the lower half are connected to a single leading scanning line SD.

In the configuration according to the third embodiment, each pair of the scanning electrodes SE1 with the width W1 and the scanning electrodes SE2 with the width W2 is connected to a single leading scanning line SD, whereby the same advantage as in the first embodiment can be obtained.

In addition, the following special advantage can be achieved: each pair of the scanning electrodes SE1 with the width W1 and the scanning electrodes SE2 with the width W2 can be connected to a single leading scanning line SD, while the leading scanning lines SD do not intersect with each other.

In the configuration according to the third embodiment, scanning electrodes SE1 and SE2 connected to the same leading scanning line SD are located adjacent to each other, and the difference between the widths W1 and W2 of the scanning electrode SE1 and SE2 is preferably large.

In a display device having the in-cell touch panel according to any of the first to third embodiments, the scanning electrodes SE1 with the width W1 and the scanning electrodes SE2 with the width W2 are alternately arranged side by side. The arrangement of the scanning electrodes SE1 and SE2, however, is not limited to this. For example, the touch panel according to each of the first to third embodiments may be configured so that the scanning electrodes SE1 with the width W1 are formed on the upper side of the first substrate SUB1, the scanning electrodes SE2 with the width W2 are formed on the lower side of the first substrate SUB1, and each pair of the scanning electrodes SE1 and the scanning electrodes SE2 is connected to a single leading scanning line SD. Alternatively, the touch panel according to each of the first to third embodiments may be configured so that the scanning electrodes SE2 with the width W2 are formed on the upper side of the first substrate SUB1, the scanning electrodes SE1 with the width W1 are formed on the lower side of the first substrate SUB1, and each pair of the scanning electrodes SE1 and the scanning electrodes SE2 is connected to a single leading scanning line SD. In addition, for example, the touch panel according to each of the first to third embodiments may be configured so that scanning electrodes SE1 with the width W1 are arranged in first and second top regions, scanning electrodes SE2 with the width W2 are arranged in third and fourth top regions, and pairs of the other scanning electrodes SE1 and pairs of the other scanning electrodes SE2 are alternately arranged. Specifically, the touch panel according to each of the first to third embodiments may be configured so that scanning electrodes SE1 (having the width W1) of each pair are adjacent to each other and scanning electrodes SE2 (having the width W2) of each pair are adjacent to each other. Even in this configuration, each pair of the scanning electrodes SE1 and the scanning electrodes SE2 is connected to a single leading scanning line SD.

The invention made by the present inventors has been described on the basis of the embodiments of the invention, but is not limited to the embodiments and may be variously modified or changed without departing from the scope of the invention.

What is claimed is:

1. A display device comprising:
    an in-cell touch panel in which a pair of transparent substrates is arranged so as to oppose each other, a plurality of scanning electrodes are arranged on an opposing surface of one of the transparent substrates, and detection electrodes that intersect with the scanning electrodes are disposed on an opposing surface of the other of the transparent substrate;
    at least one first leading lines electrically connected the scanning electrodes and configured to supply a scanning signal to the scanning electrodes;
    at least one second leading lines electrically connected to the detection electrodes and configured to output a signal detected by the detection electrodes; and
    a driving circuit disposed on a side portion on which the second leading lines are formed, the driving circuit being configured to supply the scanning signal and receive the signal detected by the detection electrodes,
    wherein each of the first leading lines is connected to at least two of the scanning electrodes having different widths,
    wherein the driving circuit has a first determination level to be used to detect, on a basis of the signal detected by the detection electrodes, whether the touch panel has been touched and a second determination level to be used to determine whether which position corresponding to the at least two of scanning electrodes connected to the first leading lines has been touched, and
    wherein when the touched position is to be detected on the basis of the detected signal, the touched position is detected in accordance with a result of comparison of the first determination level, the second determination level, and the detected signal, as well as with the position of the detection electrode where the signal was detected and the first leading lines to which the scanning signal is supplied.

2. The display device according to claim 1, wherein the driving circuit is formed in a rectangular shape, and
    wherein the scanning electrodes extend in a direction in which a short side of the display device extends, and the scanning electrodes are arranged side by side in a direction in which a long side of the display device extends.

3. The display device according to claim 1, wherein the scanning electrodes each having the different widths are alternately arranged side by side.

4. The display device according to claim 1,
    wherein the scanning electrodes are classified into a first electrode group and a second electrode group in a direction in which the scanning electrodes are arranged side by side, and
    wherein the first leading lines are connected to a scanning electrode in the first electrode group and another scanning electrode in the second electrode group.

5. The display device according to claim 4,
    wherein a pair of scanning electrodes connected to the first leading lines is the scanning electrode in the first electrode group and the other scanning electrode in the second electrode group that are symmetrically formed with respect to a center of the direction in which the scanning electrodes are arranged side by side.

6. The display device according to claim 4,
    wherein a pair of scanning electrodes connected to the first leading lines is arranged at a same position in the first and second electrode groups.

7. The display device according to claim 1,
    wherein the pair of transparent substrates are arranged so as to oppose each other with a liquid crystal layer in-between and comprise an IPS liquid crystal display panel in which a common electrode and pixel electrodes are formed on the one of the transparent substrates, the common electrode being supplied a common signal serving as a standard, the pixel electrodes being supplied image signals.

8. The display device according to claim 7,
    wherein the scanning electrodes comprise a plurality of the common electrodes.

* * * * *